United States Patent
Lee et al.

(10) Patent No.: US 8,698,092 B2
(45) Date of Patent: Apr. 15, 2014

(54) METHOD AND APPARATUS FOR MOTION RECOGNITION

(75) Inventors: Jun Haeng Lee, Hwaseong-si (KR); Delbruck Tobi, Zurich (CH); Hyunsurk Ryu, Suwon-si (KR); Keun Joo Park, Seoul (KR); Chang Woo Shin, Pohang Si (KR)

(73) Assignees: Samsung Electronics Co., Ltd., Suwon-si (KR); University of Zurich, Zurich (CH)

( * ) Notice: Subject to any disclaimer, the term of this patent is extended or adjusted under 35 U.S.C. 154(b) by 263 days.

(21) Appl. No.: 13/229,429

(22) Filed: Sep. 9, 2011

(65) Prior Publication Data

US 2012/0061568 A1 Mar. 15, 2012

(30) Foreign Application Priority Data

Sep. 10, 2010 (KR) .................. 10-2010-0089040
Apr. 6, 2011 (KR) .................. 10-2011-0031492

(51) Int. Cl.
*G06K 9/62* (2006.01)
*G01J 1/00* (2006.01)

(52) U.S. Cl.
USPC ............ 250/393; 348/169; 382/103; 382/107

(58) Field of Classification Search
USPC .......... 250/338.1, 372, 393; 345/156; 348/47, 348/169, 207.1; 382/103, 107
See application file for complete search history.

(56) References Cited

U.S. PATENT DOCUMENTS

| 6,441,848 | B1 | 8/2002 | Tull |
| 7,176,970 | B2 | 2/2007 | Lee et al. |
| 7,728,269 | B2 | 6/2010 | Lichtsteiner et al. |
| 2006/0197664 | A1 | 9/2006 | Zhang et al. |
| 2008/0225130 | A1 | 9/2008 | Paaaho et al. |
| 2010/0197399 | A1* | 8/2010 | Geiss ............................. 463/32 |
| 2010/0277411 | A1* | 11/2010 | Yee et al. ..................... 345/156 |

FOREIGN PATENT DOCUMENTS

| KR | 10-2004-0079164 | 9/2004 |
| KR | 10-2007-0010352 | 1/2007 |
| KR | 10-2008-0064856 | 7/2008 |

* cited by examiner

*Primary Examiner* — Mark R Gaworecki
(74) *Attorney, Agent, or Firm* — NSIP Law

(57) ABSTRACT

A motion recognizing apparatus and method are provided. According to an aspect, a motion recognizing apparatus may include: an optical sensor configured to sense at least a portion of a subject where a motion occurs and to output one or more events in response thereto; a motion tracing unit configured to trace a motion locus of the portion where the motion occurs based on the one or more outputted events; and a motion pattern determining unit configured to determine a motion pattern of the portion where the motion occurs based on the traced motion locus.

32 Claims, 12 Drawing Sheets

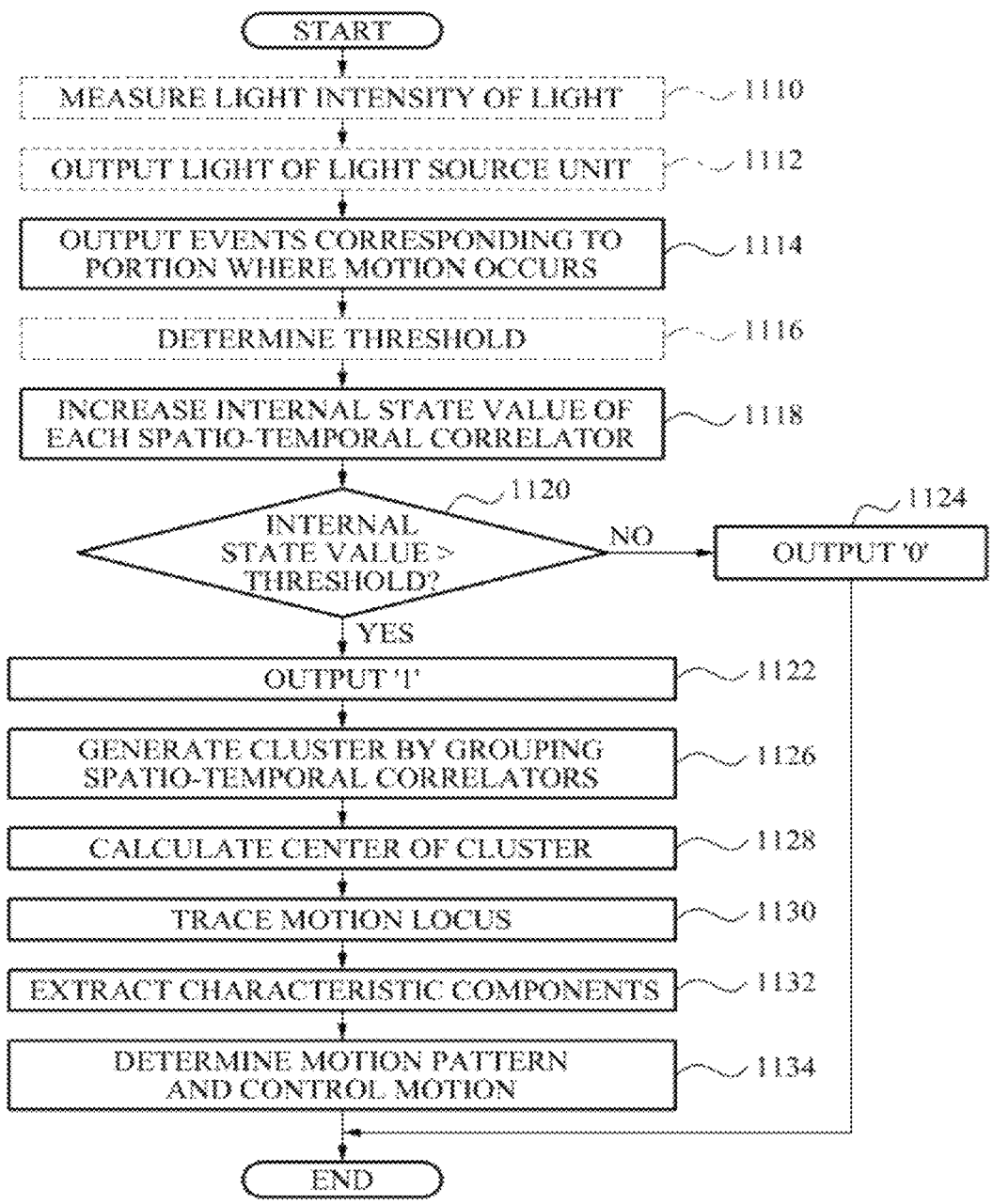

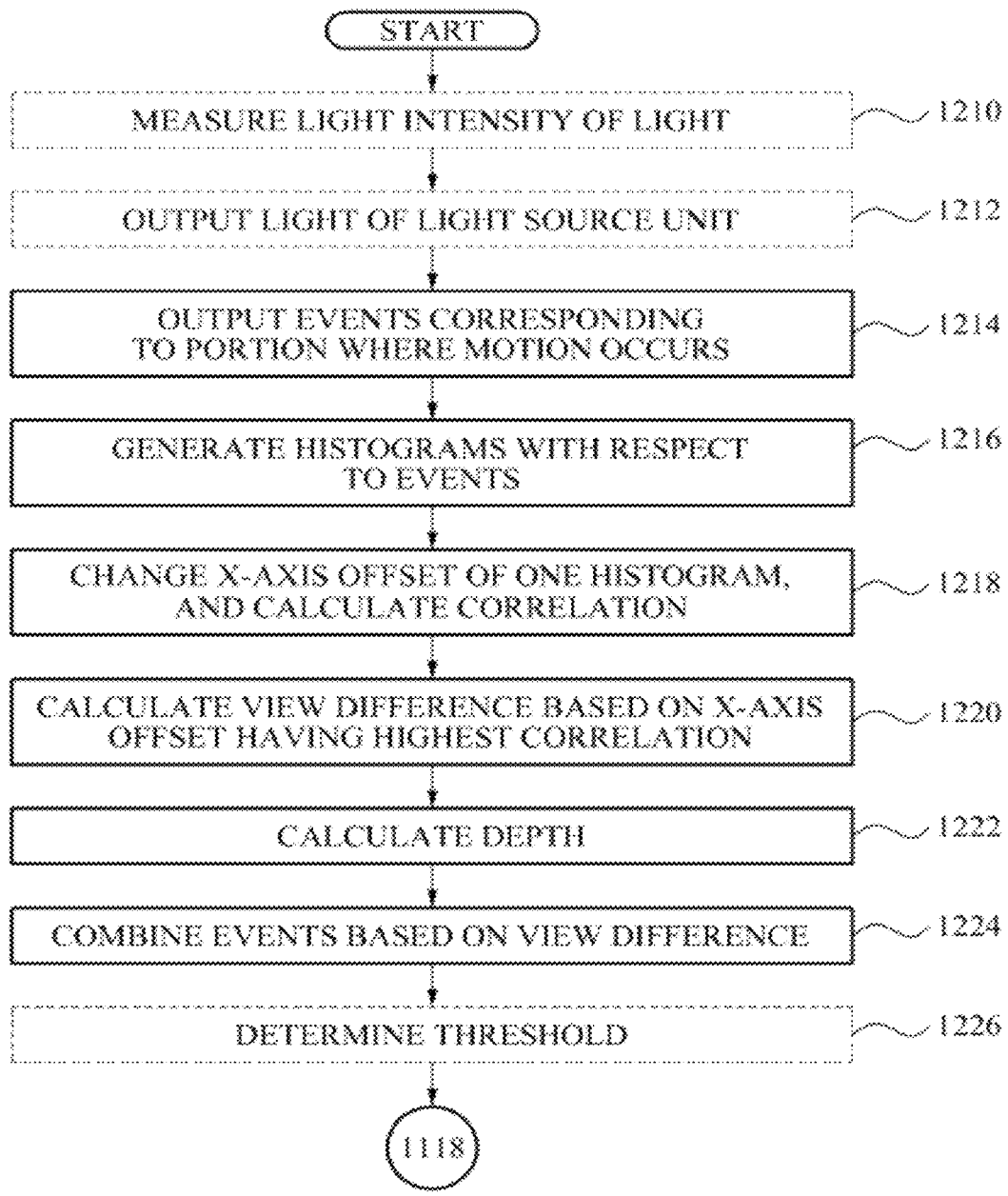

METHOD AND APPARATUS FOR MOTION RECOGNITION

CROSS-REFERENCE TO RELATED APPLICATION(S)

This application claims the benefit under 35 U.S.C. §119(a) of Korean Patent Application Nos. 10-2010-0089040 and 10-2011-0031492, respectively filed on Sep. 10, 2010 and Apr. 6, 2011, in the Korean Intellectual Property Office, the entire disclosure of which is incorporated herein by reference for all purposes.

BACKGROUND

1. Field

The following description relates to motion recognition.

2. Description of Related Art

Human interaction with electrical devices is typically performed through a user interface (UI). Conventional UIs typically include a keyboard, a mouse, a touch panel, and the like. For a touch panel, users may touch a screen to control the UI. However, over time, the screen of the touch panel may deteriorate with repeated touching. In addition, many users may find a direct touch panel dirty or unsanitary.

Users thus desire an interfacing technology that is natural, interactive, and intuitional to improve user convenience.

SUMMARY

According to an aspect, a motion recognizing apparatus may include: an optical sensor configured to sense at least a portion of a subject where a motion occurs and to output one or more events in response thereto; a motion tracing unit configured to trace a motion locus of the portion where the motion occurs based on the one or more outputted events; and a motion pattern determining unit configured to determine a motion pattern of the portion where the motion occurs based on the traced motion locus.

The apparatus may further include: a light source unit configured to output light towards the subject to illuminate the portion where the motion occurs in the subject.

The light source unit may output infrared, visible, and/or ultraviolet light.

The apparatus may further include: a light measuring unit configured to measure the intensity of the light, wherein the light source unit outputs the light when the light intensity measured by the light measuring unit is less than a predetermined intensity.

The optical sensor may include a plurality of optical sensors, and the apparatus may further include: a view difference calculator configured to calculate a view difference between the plurality of optical sensors, based on histograms of events outputted from the optical sensors; and a combining unit configured to combine, based on the calculated view difference, the events outputted from the plurality of optical sensors.

The apparatus may further include: a depth calculator configured to calculate, based on the calculated view difference, a depth of the portion where the motion occurs.

The optical sensor may include a plurality of sensing units, and target sensing units from among the plurality of sensing units outputting the events, with the target sensing units corresponding to sensing units that sense the portion where the motion occurs.

The motion tracing unit may include: one or more spatio-temporal correlators configured to calculate a spatio-temporal correlation between the target sensing units based on the events inputted from the target sensing units; and a motion locus tracing unit configured to trace the motion locus of the portion where the motion occurs.

The one or more spatio-temporal correlators may include an internal state value indicating a corresponding spatio-temporal correlation, increasing the internal state value each time the events are inputted, and compares the increased internal state value with a predetermined threshold to determine whether the corresponding spatio-temporal correlation is high or low.

The apparatus may further include: a light measuring unit to measure the intensity of the light, wherein the one or more spatio-temporal correlators set the threshold based on the measured light intensity.

The optical sensor may include a plurality of optical sensors, and the apparatus further comprises a depth calculator configured to calculate, based on a view difference between the plurality of optical sensors, a depth of the portion where the motion occurs, and each of the plurality of spatio-temporal correlators sets the threshold based on the depth of the portion where the motion occurs.

The motion locus tracing unit may be configured to generate a cluster by grouping spatio-temporal correlators having a high spatio-temporal correlation from among the plurality of spatio-temporal correlators, the cluster being in a shape corresponding to the portion where the motion occurs, and to trace the motion locus based on a center of the generated cluster and a center of a previously calculated cluster.

The plurality of spatio-temporal correlators may be mapped to divided areas of the optical sensor, and the divided areas can overlap with at least one adjacent area.

The apparatus may further include: a motion controller configured to output a control command based on the determined motion pattern.

According to another aspect, a motion recognizing method may include: sensing at least a portion of a subject where a motion occurs using an optical sensor, and outputting one or more events in response thereto; tracing a motion locus of the portion where the motion occurs, based on the one or more outputted events; and determining a motion pattern of the portion where the motion occurs based on the traced motion locus.

The method may further include: outputting light towards the subject to illuminate the portion where the motion occurs in the subject, before the sensing and the outputting the one or more events.

The method may further include: measuring the intensity of light, before the sensing and the outputting; and outputting light when the light intensity measured by the light measuring unit is less than a predetermined intensity.

The optical sensor may include a plurality of optical sensors, and the method may further include: calculating a view difference between the plurality of optical sensors, based on histograms of events outputted from the plurality of optical sensors; and combining, based on the calculated view difference, the one or more events outputted from the plurality of optical sensors.

The method may further include: calculating, based on the calculated view difference, a depth of the portion where the motion occurs.

One or more of the optical sensors may include a plurality of sensing units, and target sensing units from among the plurality of sensing units output the events, the target sensing units corresponding to sensing units that sense the portion where the motion occurs.

The method may further include: calculating, by one or more spatio-temporal correlators, a spatio-temporal correlation between the target sensing units based on the events inputted from the target sensing units.

The one or more spatio-temporal correlators may include an internal state value indicate a corresponding spatio-temporal correlation; and the calculating increases the internal state value each time the events are inputted, and compares the increased internal state value with a predetermined threshold to determine whether the corresponding spatio-temporal correlation is high or low.

The method may further include: measuring the intensity of light, wherein the calculating sets the threshold based on the measured light intensity.

The optical sensor may include a plurality of optical sensors, and the method may further include calculating, based on a view difference between the plurality of optical sensors, a depth of the portion where the motion occurs, and the calculating sets the threshold based on the depth of the portion where the motion occurs.

The tracing may include: generating a cluster by grouping one or more spatio-temporal correlators having a high spatio-temporal correlation from among the one or more spatio-temporal correlators, the cluster being in a shape corresponding to the portion where the motion occurs; calculating a center of the generated cluster; and tracing the motion locus based on the center of the generated cluster and a center of a previously calculated cluster.

The one or more spatio-temporal correlators may be mapped to divided areas of the optical sensor, and the divided areas overlap with at least one adjacent area.

The method may further include: outputting a control command based on the determined motion pattern.

According to yet another aspect, a motion recognizing apparatus for sensing motion inputted by a user may include: an optical sensor configured to sense at least a portion in a subject where a motion occurs, and to output one or more events in response thereto; and at least one processor configured to: trace a motion locus of the portion where the motion occurs, based on a spatio-temporal correlation of the one or more outputted events, determine a motion pattern of the portion where the motion occurs, based on the traced motion locus, and identify a corresponding input signal of the user based on the determined motion pattern.

An event may include information associated with a time when a corresponding event is generated, a location of a sensing unit that outputs a corresponding event, a polarity, or any combination thereof.

Other features and aspects may be apparent from the following detailed description, the drawings, and the claims.

BRIEF DESCRIPTION OF THE DRAWINGS

FIG. 11 is a flowchart illustrating a motion recognizing method of a first motion recognizing apparatus.

FIG. 12 is a flowchart illustrating a motion recognizing method of a second motion recognizing apparatus.

Figure 1:
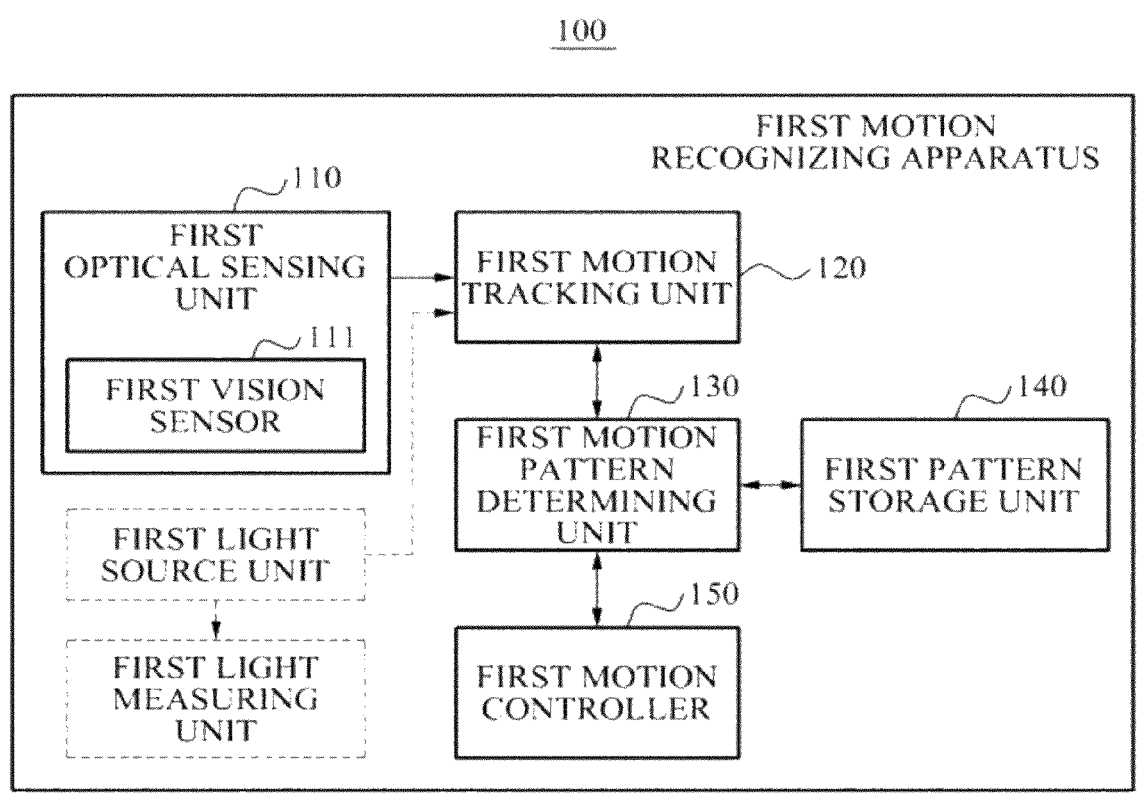
FIG. 1 is a diagram illustrating a first motion recognizing apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a first motion recognizing apparatus 100 that recognizes a motion pattern based on the motion of a subject.

As shown, the first motion recognizing apparatus 100 may include a first optical sensing unit 110, a first motion tracing unit 120, a first motion pattern determining unit 130, a first pattern storage unit 140, and a first motion controller 150.

The first optical sensing unit 110 may include, for example, a camera that photographs the subject. The camera may include features for shooting video and/or still image. The video and/or image data may include one or more electronic images or other forms of dynamic visual scene information, including discrete visual scene events. The first optical sensing unit 110 may include a first vision sensor 111 and an optical system including at least one lens. The subject may include a target that is moveable, such as, for example, a human, an animal, a robot, vehicle or the like.

Figure 3:
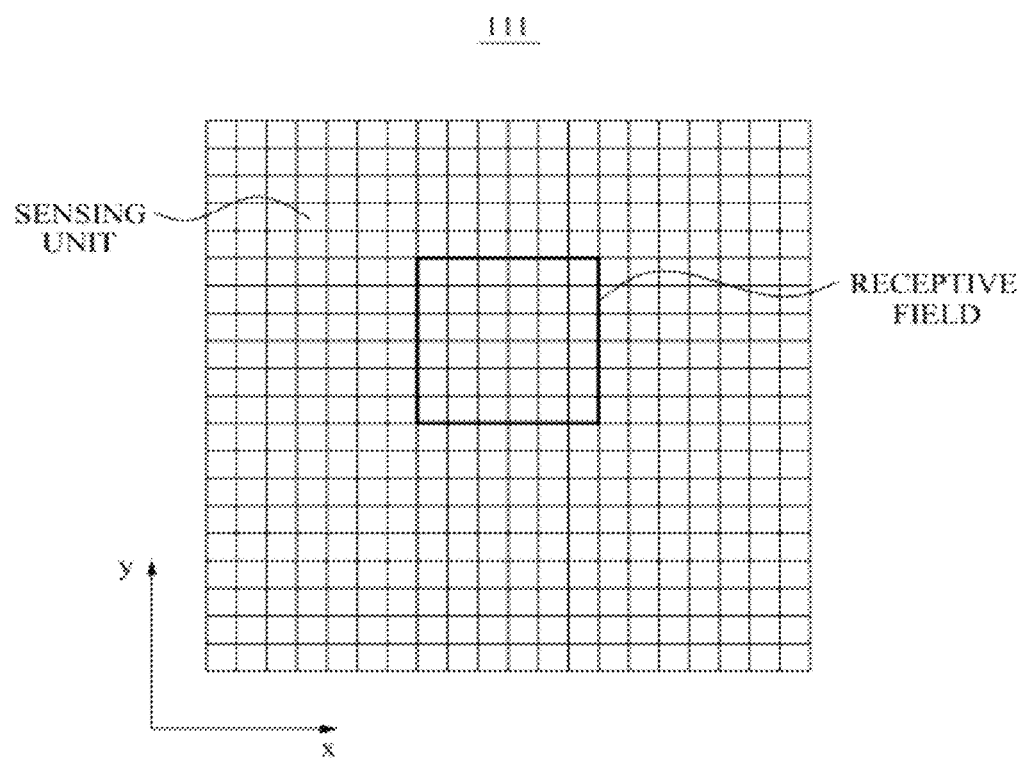
FIG. 3 is a diagram illustrating a receptive field and an array of sensing units included in a first optical sensor.

The first vision sensor 111 may sense a portion where a motion occurs in the subject and may output one or more events. The first vision sensor 111 may include one or more sensing units, for instance, as illustrated in FIG. 3. The sensing units may be configured based on a pixel unit of an image. For example, when an image outputted from the first optical sensing unit 110 is 60×60, the sensing units may be configured as a 60×60 array.

The sensing units may include a light receiving element. For instance, the light receiving element may be a charged-couple device (CCD), a complementary metal-oxide-semiconductor (CMOS) sensor, an active pixel sensor (APS), a photodetector, or other image capturing device. Light (electromagnetic energy) may be in the visible, infrared, and/or ultraviolet spectra. When the subject or a portion of the subject moves, the intensity of light sensed by the sensing units of the first vision sensor 111 may be changed. A sensing unit that sense a change in an intensity of light from among the sensing units of the first vision sensor 111 may be referred to as target sensing unit, and may output the one or more events in response thereto. Accordingly, the target sensing units corresponding to the portion where the motion occurs may output the one or more events. An event may include information associated with a time when a corresponding event is generated, a location of a sensing unit that outputs a corresponding event, and polarity, and/or the like. The polarity may be 'ON' when an event is generated since an intensity of a light received by a sensing unit increases, and may be 'OFF' when an event is generated since the intensity of the received light decreases. For example, one or more sensing units may generate an event when a change in an intensity of a light is greater than or less than a predetermined value. For another example, one or more sensing units may generate an event when a change in log intensity since the last event from the same pixel is greater than or less than a predetermined value.

The first motion tracing unit 120 may be configured to trace a motion locus of the portion of the visual scene where the motion occurs. Tracing may be based on a spatio-temporal correlation of the events outputted from the first vision sensor 111. As used herein, "spatio-temporal" means of, relating to, or existing in both space and time.

Figure 2:
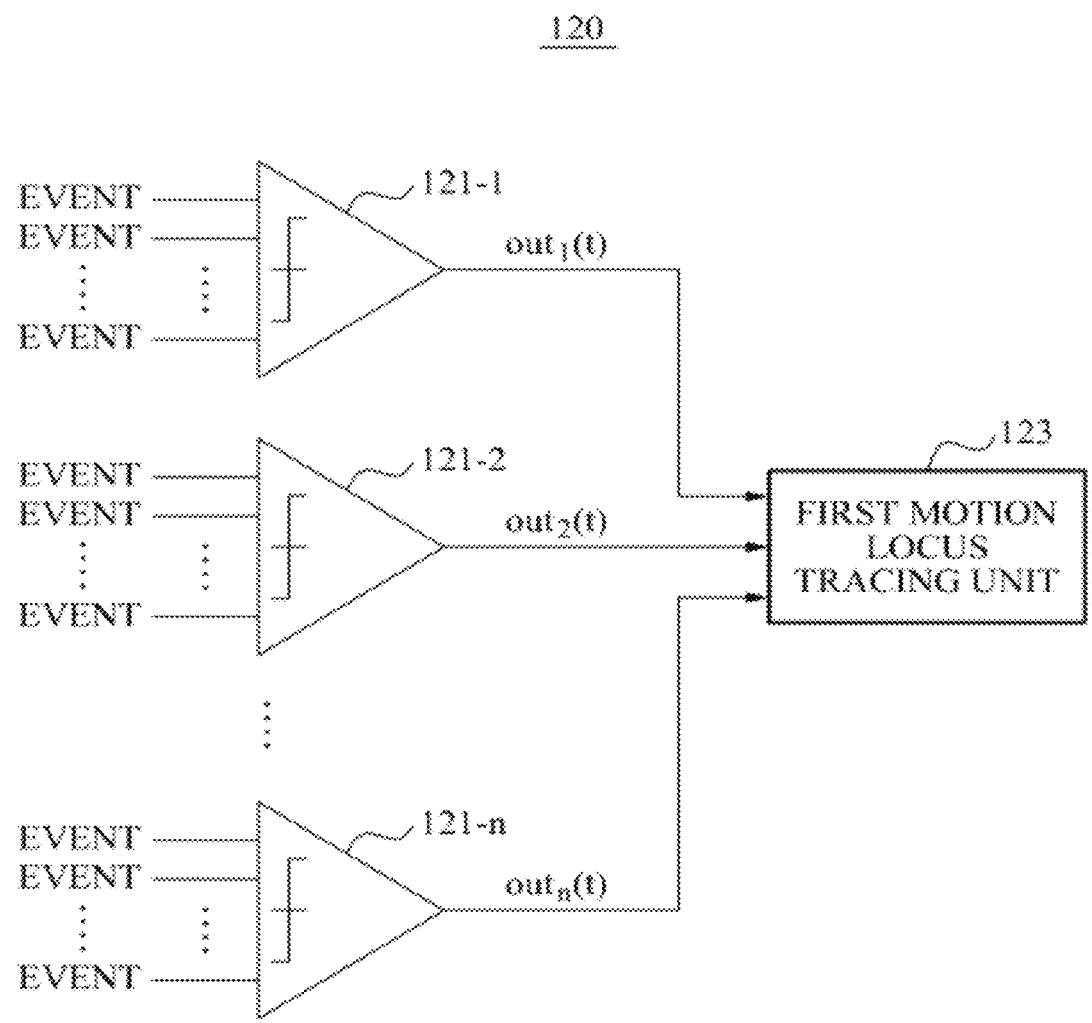
FIG. 2 is a diagram illustrating a first motion tracing unit.

FIG. 2 illustrates one embodiment of the first motion tracing unit 120.

As shown, the first motion tracing unit 120 may include a first motion locus tracing unit 123 and a first spatio-temporal correlator through an $n^{th}$ spatio-temporal correlator 121-1, 121-2, ..., 121-n, with n being a positive number.

Each of the first spatio-temporal correlator through $n^{th}$ spatio-temporal correlator 121-1, 121-2, ..., 121-n may calculate a spatio-temporal correlation between target sensing units, based on one or more events inputted from the target sensing units.

A receptive field and the first spatio-temporal correlator 121-1 may be described with reference to FIG. 3 to describe the spatio-temporal correlation.

FIG. 3 illustrates a receptive field and an array of sensing units that may be included in the first vision sensor 111.

Referring to FIG. 3, the first spatio-temporal correlator 121-1 may receive events outputted from sensing units forming a predetermined area of the first vision sensor 111. The predetermined area that is occupied by sensing units that are electrically connected to the first spatio-temporal correlator 121-1 and that are able to output events to the first spatio-temporal correlator 121-1, may be referred to as the receptive field. The receptive field may be of a size m×m, with m being a positive number. Accordingly, the first spatio-temporal correlator 121-1 may receive at least one event from at least one of the sensing units of the receptive field. The second through the $n^{th}$ spatio-temporal correlators 121-2, ..., 121-n may be connected to sensing units of corresponding receptive fields and may receive events.

Referring again to FIG. 2, each of the first spatio-temporal correlator through the $n^{th}$ spatio-temporal correlator 121-1, 121-2, ..., 121-n may include an internal state value indicating a current spatio-temporal correlation. Internal state values may be the same or may be different from each other. In some instances, the internal state value may be a voltage value. The internal state value may be determined based on a current internal state value, a newly inputted event, or both. When an event is inputted, the internal state value may be increased. On the other hand, when the event is not inputted during a predetermined time, the internal state value may be decreased. And when the internal state value decreases, a bandwidth load of a memory that stores the internal state value may be minimized.

One or more of the first spatio-temporal correlator through $n^{th}$ spatio-temporal correlator 121-1, 121-2, ..., 121-n may increase a corresponding internal state value each time events are inputted from the first vision sensor 111, and may compare the increased internal state value with a predetermined threshold to determine whether a corresponding spatio-temporal correlation is high or low with high being at least a 50% correlation and low being less than 50% correlation. The spatio-temporal correlator may indicate a temporal correlation and/or a spatial correlation of events inputted to each of the first spatio-temporal correlator through $n^{th}$ spatio-temporal correlator 121-1, 121-2, ..., 121-n.

Equation 1 may be used to calculate an output value outputted from the $n^{th}$ spatio-temporal correlator 121-n (n=1, 2, 3, ...), based on an inputted event.

$$Q_n(t)=f(Q_n(t_{prev}),e(t))$$

$$out_n(t)=\psi(Q_n(t),\phi) \quad \text{[Equation 1]}$$

In Equation 1, $Q_n(t)$ may denote an internal state value of the $n^{th}$ spatio-temporal correlator 121-n at time t, $Q_n(t_{prev})$ may denote an internal state value of the $n^{th}$ spatio-temporal correlator 121-n at a previous time, that is, a current internal state value, and $t_{prev}$ may denote a time when a most recent event set occurs from among previously inputted events. The term e(t) may denote an event set inputted at time t, $out_n(t)$ may denote an output value of the $n^{th}$ spatio-temporal correlator 121-n, and $\phi\psi(x, \phi)$ refers to a function producing a specified output (for example, an event, a state like 'high', or a value like '1', and so on) when x is greater than the threshold value $\phi$. The event set may denote information associated with events occurring at time t. For example, when three events occur at t=0, e(0)={e_1, e_2, e_3}. e_n (n=1, 2, 3, ...) may be an event of $n^{th}$ target sensing unit.

When an event is inputted, at time t, from a target sensing unit from among sensing units of a corresponding receptive field, the $n^{th}$ spatio-temporal correlator 121-n may increase a previous internal state value $Q_n(t_{prev})$. An increasing rate may be affected by a weight set for the target sensing unit where the event occurs. Therefore, when a plurality of events is simultaneously inputted, the increasing rate may be high. The weight may be differently set for each sensing unit.

One or more of the first spatio-temporal correlator through $n^{th}$ spatio-temporal correlator 121-1, 121-2, ..., 121-n may output a different output value to the first motion locus tracing unit 123, depending on whether a corresponding spatio-temporal correlator is high or low. When the internal state value $Q_n(t)$ is greater than the predetermined threshold $\phi$, the $n^{th}$ spatio-temporal correlator 121-n may determine that the spatio-temporal correlation between target sensing units outputting the events to the $n^{th}$ spatio-temporal correlator 121-n may high, and may output '1'. When the internal state value $Q_n(t)$ is less than or equal to the predetermined threshold $\phi$, the $n^{th}$ spatio-temporal correlator 121-n may determine that the spatio-temporal correlation is low, and may output '0'. '1' may be outputted as 'high' or 'true', and '0' may be outputted as 'low' or 'false'. When the $n^{th}$ spatio-temporal correlator 121-n outputs '1', the $n^{th}$ spatio-temporal correlator 121-n may decrease the internal state value of the $n^{th}$ spatio-temporal correlator 121-n by a predetermined amount.

The internal state value $Q_n(t)$ outputted by the $n^{th}$ spatio-temporal correlator 121-n may indicate a spatial correlation and a temporal correlation between events inputted from the target sensing units to the $n^{th}$ spatio-temporal correlator 121-$n$. For example, when events are successively inputted from a single target sensing unit to the $n^{th}$ spatio-temporal correlator 121-$n$, the internal state value $Q_n(t)$ may denote a temporal correlation between the inputted events. When two (or more) events are simultaneously inputted from two (or more) target sensing units to the $n^{th}$ spatio-temporal correlator 121-$n$, for example, when the two (or more) target sensing units are close to each other and are connected to the same $n^{th}$ spatio-temporal correlator 121-$n$, the inputted events may have a high spatial correlation. The two (or more) events may be simultaneously inputted from the target sensing units and thus, the events may also have a temporal correlation.

The first spatio-temporal correlator through the $n^{th}$ spatio-temporal correlator 121-1, 121-2, ..., 121-$n$ may have a spatial correlation.

Figure 4:
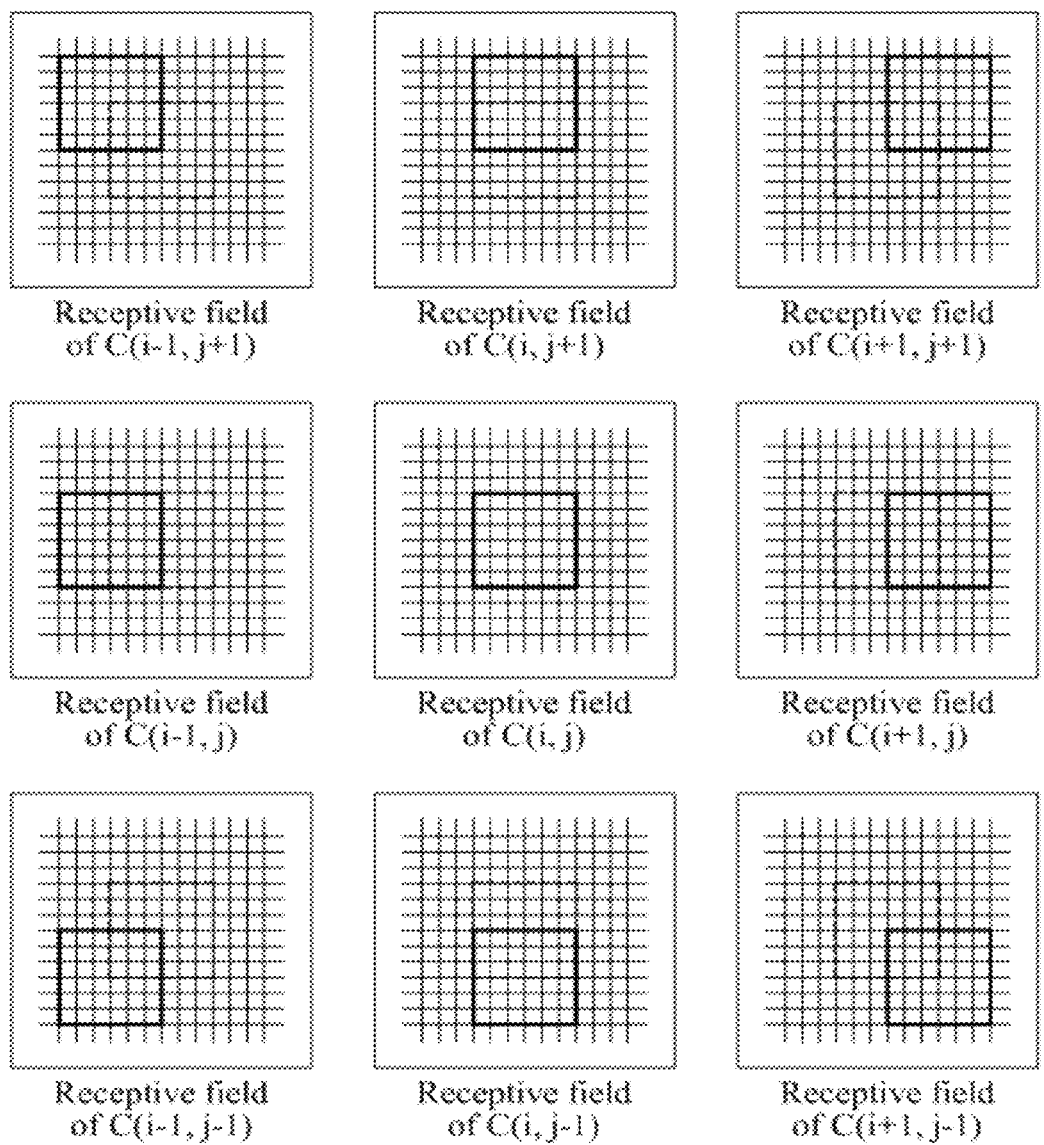
FIG. 4 is a diagram illustrating a spatial correlation between a first spatio-temporal correlator through an $n^{th}$ spatio-temporal correlator.

FIG. 4 illustrates a spatial correlation between a first spatio-temporal correlator through an $n^{th}$ spatio-temporal correlator.

Referring to FIG. 4, the first vision sensor 111 may be divided into a plurality of receptive fields. The field division may be logical in some instances. The plurality of receptive fields may overlap with at least one adjacent area. The first spatio-temporal correlator through the $n^{th}$ spatio-temporal correlator 121-1, 121-2, ..., 121-$n$ may be mapped to the plurality of receptive fields of the first vision sensor 111. Sensing units in each receptive field may output events to a corresponding spatio-temporal correlator from among the first spatio-temporal correlator through the $n^{th}$ spatio-temporal correlator 121-1, 121-2, ..., 121-$n$.

In FIG. 4, C(i,j) may refer to be center coordinates of a receptive field located in a center of the first vision sensor 111. C(i−1,j) may be center coordinates of a receptive field that is moved by '1' in an x-axis direction, for example, in a horizontal direction. In addition, '1' may denote that the center coordinates is spaced by three pixels, which may be variously defined.

When several portions of receptive fields overlap with each other, the same event may be simultaneously outputted to at least two spatio-temporal correlators. And when the several portions of receptive fields overlap with each other, there may be a spatial correlation between first spatio-temporal correlator through the $n^{th}$ spatio-temporal correlator 121-1, 121-2, ..., 121-$n$ or a spatial correlation between the receptive fields. The spatial correlation between the first spatio-temporal correlator through an $n^{th}$ spatio-temporal correlator 121-1, 121-2, ..., 121-$n$ may affect tracing of a motion locus.

Referring again to FIG. 2, the first motion locus tracing unit 123 may trace a motion locus of a portion where a motion occurs, based on an output value of a spatial-temporal correlation calculated from each of the first spatio-temporal correlator through an $n^{th}$ spatio-temporal correlator 121-1, 121-2, ..., 121-$n$, for example, depending on whether a spatial-temporal correlation calculated from each spatio-temporal correlator is high or low.

The first motion locus tracing unit 123 may generate a single cluster by grouping of spatio-temporal correlators having a high spatio-temporal correlation from among the first spatio-temporal correlator through an $n^{th}$ spatio-temporal correlator 121-1, 121-2, ..., 121-$n$. The first motion locus tracing unit 123 may perform grouping of the spatio-temporal correlators that output '1' from among the first spatio-temporal correlator through an $n^{th}$ spatio-temporal correlator 121-1, 121-2, ..., 121-$n$, based on the overlap of the several portions of the receptive fields. The first motion locus tracing unit 123 may be configured to perform grouping of the spatio-temporal correlators overlapping with each other, to generate the single cluster. Outputting of '1' may indicate a high spatio-temporal correlation, for instance.

Figure 5:
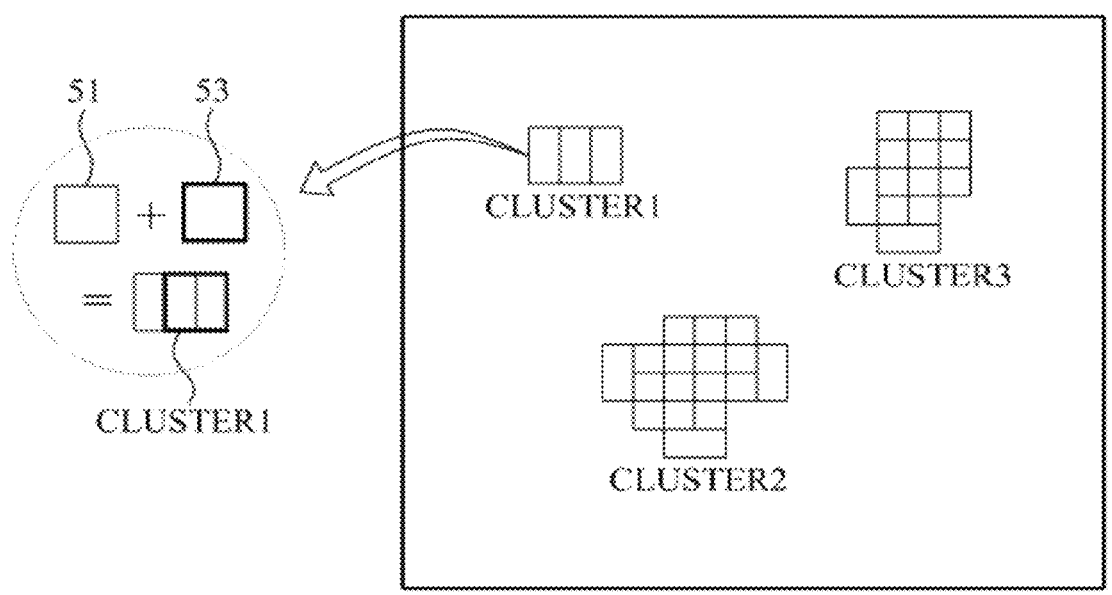
FIG. 5 is a diagram illustrating generating a cluster 1 through a cluster 3 by grouping a first spatio-temporal correlator through an $n^{th}$ spatio-temporal correlator.

FIG. 5 illustrates generating a cluster 1 through a cluster 3 by grouping a first spatio-temporal correlator through an nth spatio-temporal correlator 121-1, 121-2, ..., 121-$n$.

Referring to FIG. 5, the cluster 1 may be generated by grouping two receptive fields 51 and 53, several portions of which overlap with each other. The cluster 2 may be generated by grouping ten receptive fields, several portions of which overlap with each other. And the cluster 3 may be generated by grouping seven receptive fields, several portions of which overlap with each other.

The first motion locus tracing unit 123 may be aware of a location of a portion where a motion occurs, based on a cluster. A target sensing unit that senses a change in an intensity of a light may output an event and thus, the first vision sensor 111 may be aware of the portion where the motion occurs based on a spatio-temporal correlation between events. The first motion locus tracing unit 123 may calculate a center of the cluster, and may trace the motion locus based on the calculated center and a center of previously calculated cluster. The cluster may be in a form corresponding to the portion where the motion occurs.

The first motion locus tracing unit 123 may be configured to multiply a location and a constant of each spatio-temporal correlator included in the cluster, and may determine an average value of multiplied values as the center of the cluster. The location of each spatio-temporal correlator may be a representative location of an area covered by a corresponding spatio-temporal correlator. The constant of each spatio-temporal correlator may be set according to various values, such as an internal state value $Q(t)$ calculated by a corresponding spatio-temporal correlator, a number of events inputted to a corresponding spatio-temporal correlator for a predetermined time period, and/or the like.

For example, the cluster may be generated by grouping of the first spatio-temporal correlator 121-1 and the second spatio-temporal correlator 121-2. An internal state value of the first spatio-temporal correlator 121-1 may be Q1 and an internal state value of the second spatio-temporal correlator 121-2 may be Q2. A representative location of the first spatio-temporal correlator 121-1 may be (x1, y1), and a representative location of the second spatio-temporal correlator 121-2 may be (x2, y2). The first motion locus tracing unit 123 may calculate the center of the cluster using Equation 2.

$$x' = \frac{(Q1 \times x1) + (Q2 \times x2)}{Q1 + Q2}$$ [Equation 2]
$$y' = \frac{(Q1 \times y1) + (Q2 \times y2)}{Q1 + Q2}$$

In Equation 2, x' may denote an x coordinate of the center of the cluster, and y' may denote a y coordinate of the center of the cluster.

Figure 6:
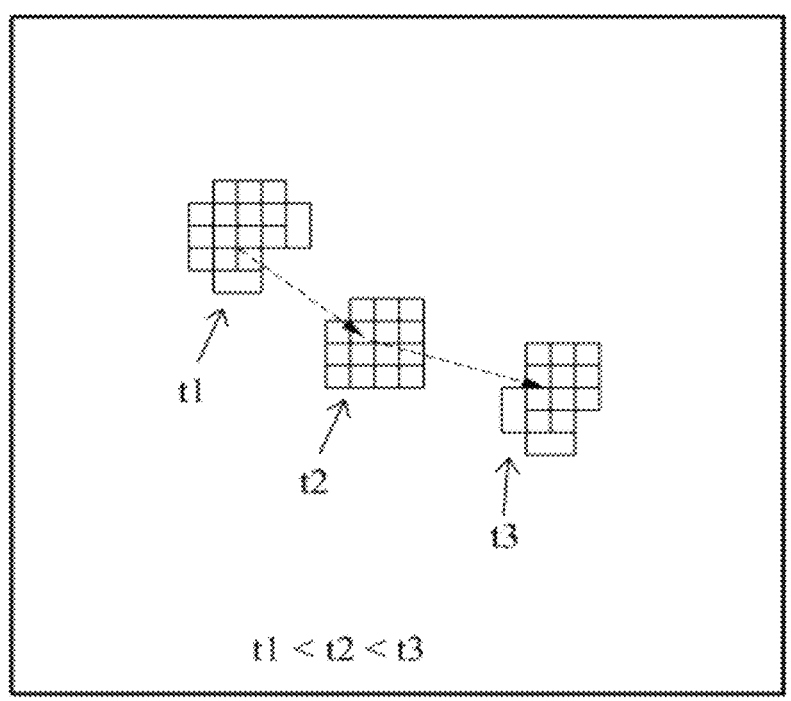
FIG. 6 is a diagram illustrating tracing a motion locus of a portion where a motion occurs, based on a generated cluster.

FIG. 6 illustrates tracing a motion locus of a portion where a motion occurs, based on a generated cluster.

The first motion locus tracing unit 123 may calculate a center of a cluster, each time the cluster is generated. Referring to FIG. 6, the first motion locus tracing unit 123 may sequentially generate clusters at times t1, t2, and t3, and may be configured to calculate a center of each of the clusters. The first motion locus tracing unit 123 may trace a motion locus by connecting the calculated centers. The motion locus of the portion where the motion occurs may be traced by calculating locations of the grouped spatio-temporal correlators, for example, locations of grouped receptive fields.

Figure 7:
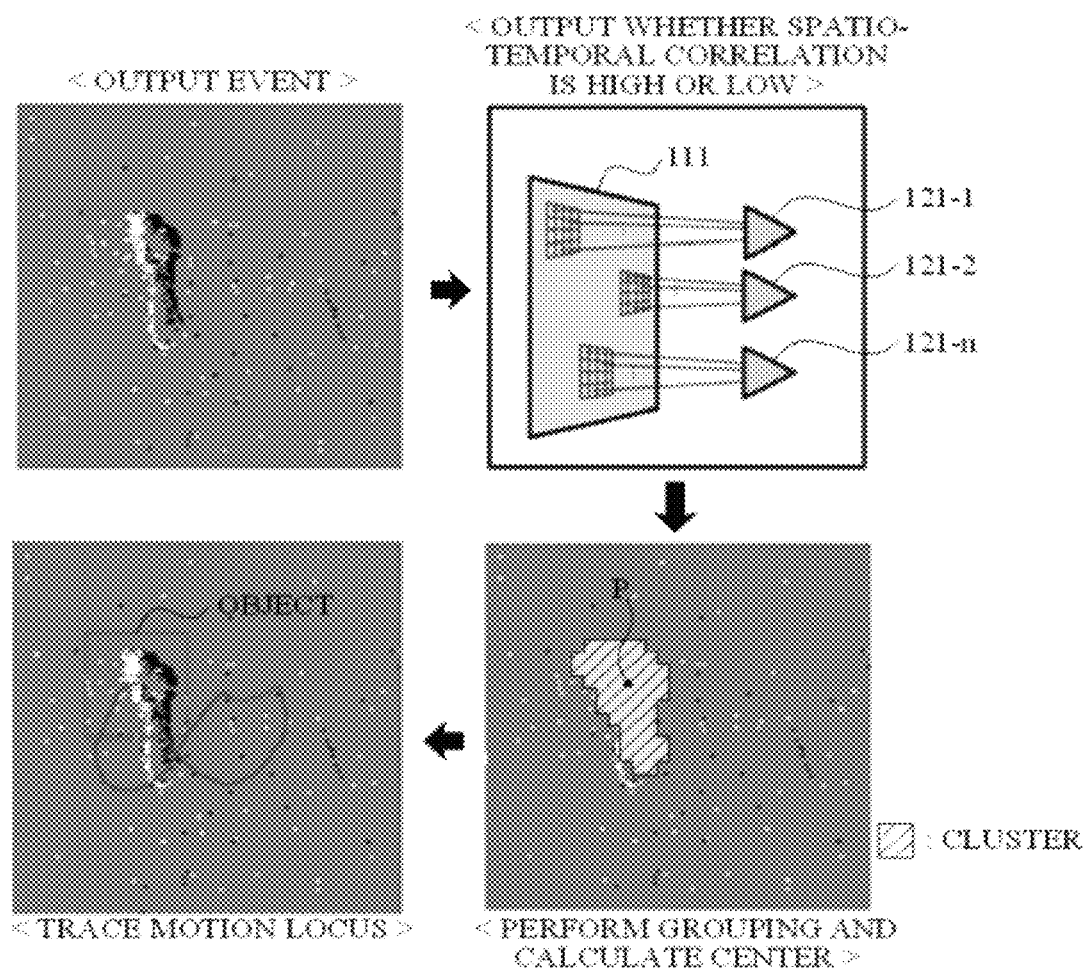
FIG. 7 is a diagram illustrating a process of tracing a motion locus based on outputted events.

FIG. 7 illustrates a process of tracing a motion locus based on outputted events.

In FIG. 7, a white point may denote an event of an 'OFF' polarity that is generated due to a decrease in an intensity of a light, and a black point may denote an event of an 'ON' polarity that is generated due to an increase in an intensity of a light. A portion where events are clustered may be a portion where a motion sensed by the first vision sensor 111 exists. When a density of events is high, it may indicate that the intensity of the light is significantly changed. One or more of the $n^{th}$ spatio-temporal correlators 121-1, 121-2, . . . , 121-$n$ may output, based on inputted event(s), an output value indicating whether a spatio-temporal correlation is high or low. The first motion locus tracing unit 123 may generate a cluster by grouping spatio-temporal correlators outputting '1' from among the first spatio-temporal correlator through the $n^{th}$ spatio-temporal correlator 121-1, 121-2, . . . , 121-$n$, and may calculate a center (p) of the cluster. The first motion locus tracing unit 123 may trace a motion locus by connecting the calculated center and a previously calculated center. An 'object' may refer to the portion where the motion occurs and may be an area corresponding to the cluster. For example, the 'object' may be a person's hand or other moveable element.

Referring again to FIG. 1, the first motion pattern determining unit 130 may be configured to determine a motion pattern of the portion where the motion occurs, based on the motion locus traced by the first motion tracing unit 120. For example, the first motion pattern determining unit 130 may obtain, from the traced motion locus, characteristic components to be used for expressing a motion pattern, and may compare the characteristic components with motion patterns stored in the first pattern storage unit 140 to determine a motion pattern of the portion where the motion occurs. One or more parameters, such as a location of the cluster, a direction where the cluster moves towards, an angle of the motion of the cluster, and/or the like, may be used as the characteristic components.

The first pattern storage unit 140 may store a plurality of characteristic components and motion patterns corresponding thereto, for example in a memory.

The first motion controller 150 may identify an input signal of a user based on the determined motion pattern, and may output, to a device, a control command to control the device based on the identified input signal of the user. The device may be located in an area and having wired/or and wireless communications with the first motion recognizing apparatus 100. The first motion recognizing apparatus 100 may be included in the device.

The first vision sensor 111 that outputs events based on the portion where the motion occurs may be affected by the brightness of an environment. For example, when the brightness of the environment is relatively low, the first vision sensor 111 may output a smaller number of events when compared to a case where the brightness of the environment is relatively high.

To decrease the effect of the brightness of the environment, the first motion recognizing apparatus 100 may further include a first light source unit 160, a first light measuring unit 170, or both.

And when the first motion recognizing apparatus 100 includes only the first light source unit 160, the first light source unit 160 may output light towards the subject to accurately illuminate the portion where the motion occurs even through the brightness of the environment is low. In some instances, the outputted light may be an infrared light. Other spectra of light may also be used such as visible or ultraviolet.

When the first motion recognizing apparatus 100 includes both the first light source unit 160 and the first light measuring unit 170, the first light measuring unit 170 may be configured to measure the intensity of the light. And when the light intensity measured by the first light measuring unit 170 is less than a predetermined intensity, the first light source unit 160 may output the light.

When the first motion recognizing apparatus 100 includes only the first light measuring unit 170, the first light measuring unit 170 may measure a light intensity of light, and the first spatio-temporal correlator through the $n^{th}$ spatio-temporal correlator 121-1, 121-2, . . . , 121-$n$ may set a threshold based on the light intensity, before determining whether a spatio-temporal correlation is high or low. If the light intensity is weak, the first spatio-temporal correlator through the $n^{th}$ spatio-temporal correlator 121-1, 121-2, . . . , 121-$n$ may set the threshold to be relatively low, and when the intensity of the light is strong, the first spatio-temporal correlator through the $n^{th}$ spatio-temporal correlator 121-1, 121-2, . . . , 121-$n$ may set the threshold to be relatively high.

In some implementations, the first motion recognizing apparatus 100 may further include a controller. The controller may be configured to control operations of the first motion recognizing apparatus 100 and may perform functions of the first motion tracing unit 120, the first motion pattern determining unit 130, and the first motion controller 150. In some implementations, the controller may include at least one processor configured to perform functions of the first motion tracing unit 120, the first motion pattern determining unit 130, and the first motion controller 150.

Figure 8:
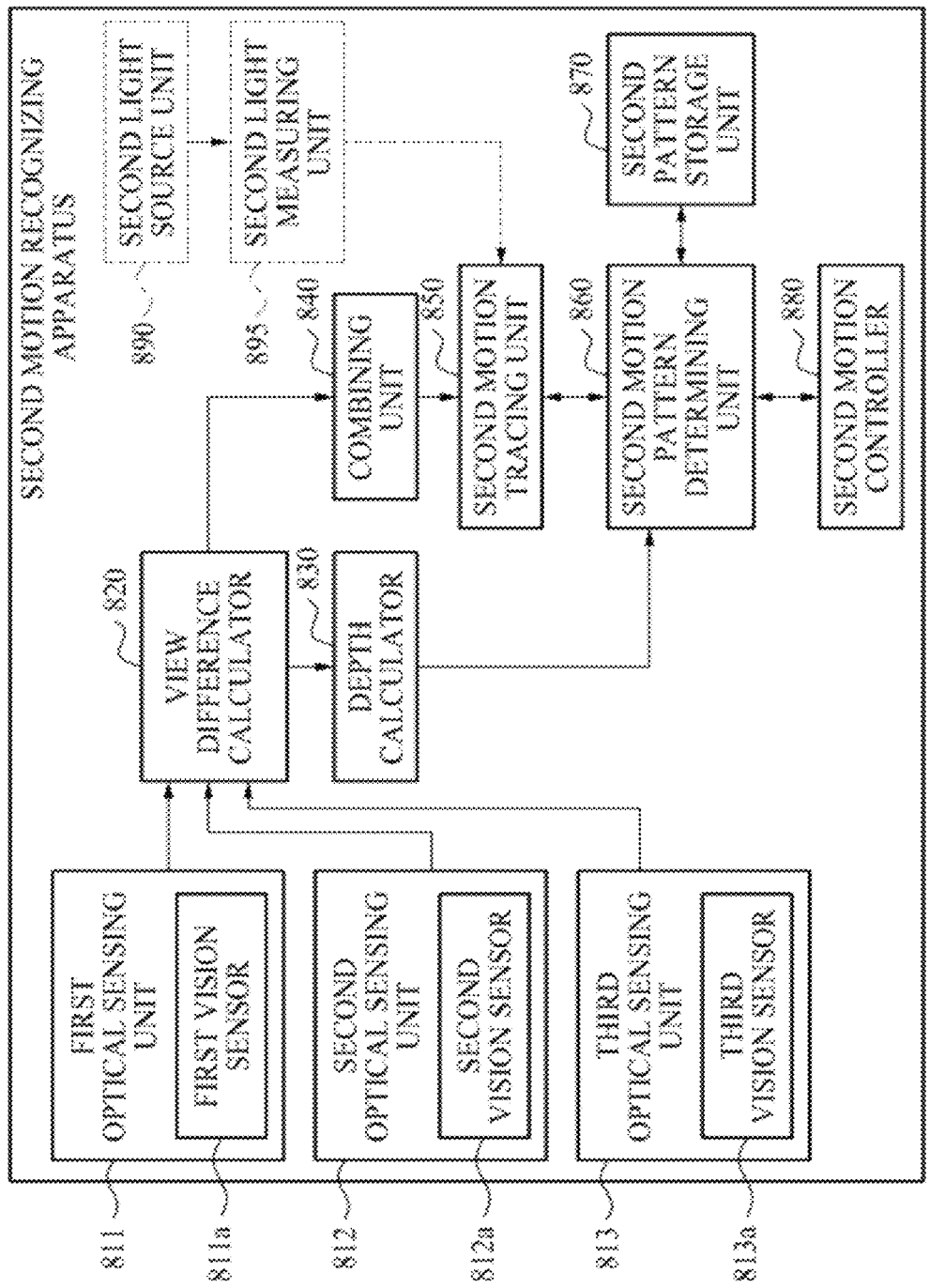
FIG. 8 is a diagram illustrating a second motion recognizing apparatus.

FIG. 8 illustrates a second motion recognizing apparatus 800.

As shown, the second motion recognizing apparatus 800 that recognizes a motion pattern based on a motion of a subject may include a first optical sensing unit 811, a second optical sensing unit 812, a third optical sensing unit 813, a view difference calculator 820, a depth calculator 830, a combining unit 840, a second motion tracing unit 850, a second motion pattern determining unit 860, a second pattern storage unit 870, and a second motion controller 880.

The first optical sensing unit 811 through the third optical sensing units 813, the second motion tracing unit 850, the second motion pattern determining unit 860, the second pattern storage unit 870, and the second motion controller 880 may be similar to the first optical sensing unit 110, the first motion tracing unit 120, the first motion pattern determining unit 130, the first pattern storage unit 140, and the first motion controller 150, respectively, in some embodiments.

The second motion recognizing apparatus 800 may include a plurality of optical sensing units, and three optical sensing units, i.e., the first optical sensing unit 811, the second optical sensing unit 812, and the third optical sensing unit 813 are illustrated in FIG. 8. The first optical sensing unit 811, the second optical sensing unit 812, and the third optical sensing unit 813 may sense the same subject or different subjects, and may respectively include a first vision sensor 811$a$, a second vision sensor 812$a$, and a third vision sensor 813$a$. One or more of the first vision sensor 811$a$, the second vision sensor 812$a$, and the third vision sensor 813$a$ may sense a portion where a motion occurs and output an event, and may perform operations similar to operations of the first vision sensor 111.

The view difference calculator 820 may calculate a view difference between the first vision sensor 811$a$, the second vision sensor 812$a$, and the third vision sensor 813$a$, based on histograms of events outputted from the first image sensor 811a, the second image sensor 812a, and the third image sensor 813a. For example, when two optical sensing units, i.e., the first optical sensing unit 811 and the second optical sensing unit 812, photograph the same subject, the first optical sensing unit 811 and the second optical sensing unit 812 respectively correspond to a left eye and a right eye of the viewer. Therefore, the calculated view difference may be a view difference observed between two eyes.

When motion recognition is performed based on the first optical sensing unit 811, the second optical sensing unit 812, and the third optical sensing unit 813, the second motion recognizing apparatus 800 may three-dimensionally recognize a motion in the portion where the motion occurs. The second motion recognizing apparatus 800 may obtain a depth of the portion where the motion occurs from the first optical sensing unit 811, the second optical sensing unit 812, and the third optical sensing unit 813, in addition to information associated with a two-dimensional (2D) location, such as top and bottom, and/or left and right, of the portion where the motion occurs.

Figure 9:
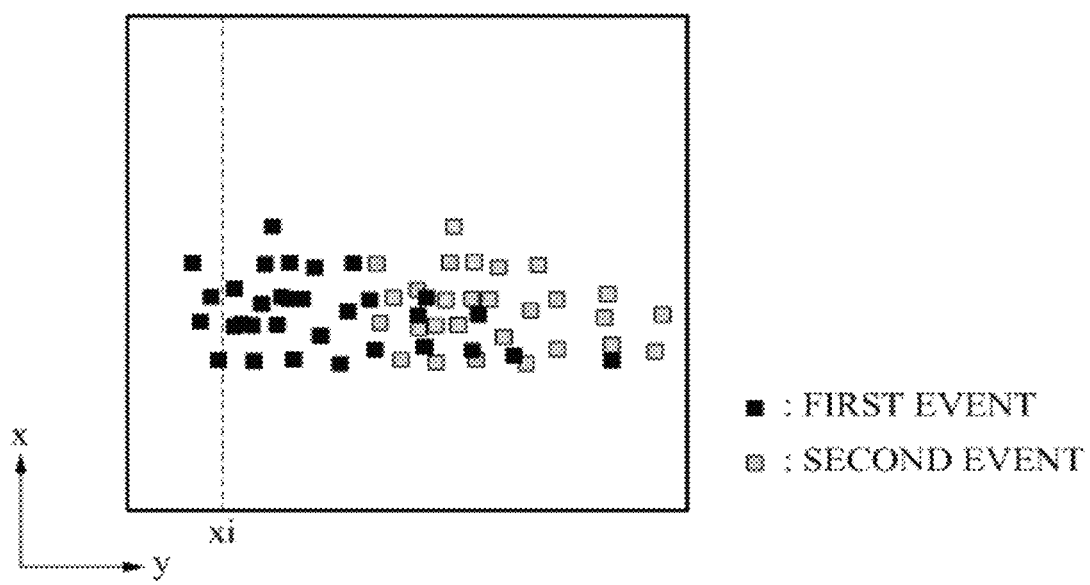
FIG. 9 is a diagram illustrating events outputted from a first vision sensor of a first optical sensing unit and a second vision sensor of a second optical sensing unit.

FIG. 9 illustrates events outputted from the first image sensor 811a of the first optical sensing unit 811, and the second image sensor 812a of the second optical sensing units 812.

Referring to FIG. 9, first events may denote events outputted from the first image sensor 811a, and second events may denote events outputted from the second image sensor 812a. A distribution of the first events and a distribution of the second events may be similar to each other, in some instances.

The view difference calculator 820 may calculate a first histogram with respect to a first histogram and a second histogram with respect to a second event, based on an x-axis address.

Figure 10:
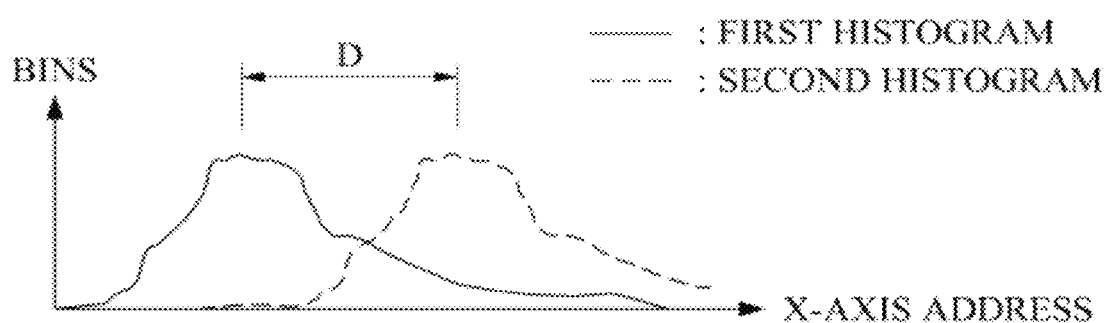
FIG. 10 is a diagram illustrating a process of determining a view difference based on histograms of events.

FIG. 10 illustrates a process of determining a view difference based on histograms of events.

Referring to FIG. 10, the x-axis address may be x-axis coordinates of locations of sensing units constituting the first image sensor 811a, and Bins may denote a number of target sensing units that have the same x-axis address $x_i$ from among target sensing units that simultaneously generate first events. The first histogram may be a result of a calculation of Bins with respect to all x-axis addresses, in this instance. The above descriptions may also be applicable to a second or additional histogram.

In one embodiment, the view calculator 820 may be configured to calculate a view difference between two eyes based on a correlation between the first histogram and the second histogram. The view difference calculators 820 may move one of the first histogram and the second histogram, for example the first histogram, by a predetermined offset interval in an x-axis direction, and may calculate the correlation between the first histogram and the second histogram. The correlation may denote a similarity between the first histogram and the second histogram, and when the correlation is '1', the first histogram and the second histogram are identical with each other. When the first histogram and the second histogram are similar to each other, that is, when the correlation is closest to '1' or is the same as '1', the view difference calculator 820 may determine, as the view difference between two eyes, a distance that the first histogram moves.

The depth calculator 830 may calculate a depth of a portion where a motion occurs, based on the view difference between two eyes of the viewer. An algorithm that calculates the depth from the view difference may use one of various well-known schemes. The portion where the motion occurs becomes closer to the first and the second optical sensing units 811 and 812 as the calculated view difference becomes higher.

The combining unit 840 may combine, based on the calculated view difference, events outputted from the first and the second image sensor 811a and 812a, and may output a single image constituted by the events. For example, the combining unit 840 may generate an image by combining, based on the calculated view difference, the first and the second events outputted from the first and second image sensors 811a and 812a to enable a portion where a great motion occurs to overlap.

The second motion tracing unit 850 may determine the portion where the motion occurs and may trace a motion locus, based on the events of the image outputted from the combining unit 840 using a plurality of spatio-temporal correlators. A distribution of the events constituting the image outputted from the combining unit 840 may be classified as a densely concentrated area and a less concentrated area. The second motion tracing unit 850 may trace the motion locus based on events of a highest density area. A high density of the events may indicate a high degree of movement in some instances.

The second motion tracing unit 850 may trace the motion locus based on the depth of the portion where the motion occurs that is calculated by the depth calculator 830.

One or more of the plurality of spatio-temporal correlators included in the second motion tracing unit 850 may set a threshold based on the depth of the portion where the motion occurs, before determining whether a spatio-temporal correlation is high or low. When a distance from the second motion recognizing apparatus 200 to the portion where the motion occurs is long, each of the spatio-temporal correlators included in the second motion tracing unit 850 may set the threshold to be relatively low, and when the distance between the second motion recognizing apparatus 200 to the portion where the motion occurs is short, one or more of the spatio-temporal correlators may set the threshold to be relatively high.

The second motion pattern determining unit 860 may determine a motion pattern of the portion where the motion occurs, from the motion locus traced by the second motion tracing unit 850. The second motion pattern determining unit 860 may determine the motion pattern of the portion where the motion occurs, based on the motion patterns stored in the second pattern storage unit 870.

In some embodiments, the second motion controller 880 may identify an input signal of a user based on the determined motion pattern, and may output, to a device, a control command to control the device, based on the identified input signal of the user.

The first image sensor 811a, the second image sensor 812a, and the third image sensor 813a that output events based on the portion where the motion occurs may be affected by brightness of an environment. When the brightness of the environment is relatively low, the first image sensor 811a, the second image sensor 812a, and the third image sensor 813a may output a smaller number of events when compared to a case where the brightness of the environment is relatively high. Brightness may be relative to a predetermined light intensity level.

To decrease the effect of the brightness of the environment, the second motion recognizing apparatus 800 may include at least one of a second light source 890 and a second light measuring unit 895.

When the second motion recognizing apparatus 800 includes only the second light source unit 890, the second light source unit 890 may output a light towards the subject to accurately sense the portion where the motion occurs even though the brightness of the environment is low. The outputted light may be infrared light in some instances.

When the second motion recognizing apparatus 800 includes both the second light source unit 890 and the second light measuring unit 895, the second light measuring unit 895 may measure the intensity of the light. When the light intensity measured by the second light measuring unit 895 is less than a predetermined intensity, the second light source unit 890 may output the light.

When the second motion recognizing apparatus 800 includes only the second light measuring unit 895, the second light measuring unit 895 may measure a light intensity of light, and each of the spatio-temporal correlators included in the second motion tracing unit 850 may set the threshold based on the light intensity, before determining whether a spatio-temporal correlation is high or low. When the light intensity is weak, each of the spatio-temporal correlators included in the second motion tracing unit 850 may set the threshold to be relatively low, and when the light intensity is strong, each of the spatio-temporal correlators may set the threshold to be relatively high.

In some embodiments, the second motion recognizing apparatus 800 may further include a controller. The controller may be configured to control operations of the second motion recognizing apparatus 800. The controller may perform functions of the view difference calculator 820, the depth calculator 830, the combining unit 840, the second motion tracing unit 850, the second motion pattern determining unit 860, and the second motion controller 880. The controller, the view difference calculator 820, the depth calculator 830, the combining unit 840, the second motion tracing unit 850, the second motion pattern determining unit 860, and the second motion controller 880 have been separately illustrated to describe respective functions. In some instances, various functions may be combined. Accordingly, the controller may include at least one processor configured to perform functions of the view difference calculator 820, the depth calculator 830, the combining unit 840, the second motion tracing unit 850, the second motion pattern determining unit 860, and the second motion controller 880. FIG. 11 illustrates a motion recognizing method of the first motion recognizing apparatus 100.

Referring to FIG. 11, one or more operations may be performed by a controller and/or a processor of the first motion recognizing apparatus 100 of FIG. 1.

In operation 1110, when the first motion recognizing apparatus 100 includes a light measuring unit, the first motion recognizing apparatus 100 may measure the intensity of the light.

In operation 1112, the first motion recognizing apparatus 100 may output a light towards a subject to sense a portion where the motion occurs in the subject. For example, light may be outputted every time the subject is photographed or may be outputted when the light intensity measured in operation 1110 is less than a predetermined intensity.

Operation 1110 and operation 1112 may be optional and thus, both operations may not be included in all embodiments.

In operation 1114, the first motion recognizing apparatus 100 may photograph a subject using a camera, and may output, to corresponding spatio-temporal correlators, events through sensing units corresponding to the portion where a motion occurs, while photographing the subject. The camera may include an image sensor having an array of a plurality of sensing units. The image sensor may sense the portion where the motion occurs to output events, based on a change in an intensity of light.

In operation 1116, a threshold that determines whether a spatio-temporal correlation is high or low may be determined. For, the threshold may be set to a predetermined value or may vary based on the light intensity measured in operation 1110.

In operation 1118, the first motion recognizing apparatus 100 may increase an internal state value of spatio-temporal correlators, based on inputted events. The internal state value may be an index indicating a spatio-temporal correlation between the events.

In operation 1120, the first motion recognizing apparatus 100 may compare an internal state value with the threshold for each spatio-temporal correlator.

When the increased internal state value is greater than a predetermined threshold, the first motion recognizing apparatus 100 may determine that a spatio-temporal correlation of a corresponding spatio-temporal correlator is high and may output '1' in operation 1122.

When the increased internal state value is less than or equal to the predetermined threshold, the first motion recognizing apparatus 100 may determine that the spatio-temporal correlation of the corresponding spatio-temporal correlator is low and may output '0' in operation 1124.

In operation 1126, the first motion recognizing apparatus 100 may generate a cluster by grouping spatio-temporal correlators that output '1'. For example, the first motion recognizing apparatus 100 may generate the cluster by grouping of the spatio-temporal correlators that overlaps with adjacent spatio-temporal correlators.

In operation 1128, the first motion recognizing apparatus 100 may calculate a center of one or more cluster. For example, the first motion recognizing apparatus 100 may calculate the center of each cluster, based on a location and a constant of each spatio-temporal correlator included in a corresponding cluster.

In operation 1130, the first motion recognizing apparatus 100 may trace a motion locus of the portion where a motion occurs based on the calculated center and a center of a previously calculated cluster.

In operation 1132, the first motion recognizing apparatus 100 may extract characteristic components for expressing a motion pattern from the traced motion locus.

In operation 1134, the first motion recognizing apparatus 100 may compare the extracted characteristic components with previously stored motion patterns to determine the motion pattern of the portion where the motion occurs, and may control a motion of a device based on the determined motion pattern. The device may be connected to the first motion recognizing apparatus 100 or the first motion recognizing apparatus 100 may be included in the device, for instance.

FIG. 12 illustrates a motion recognizing method of the second motion recognizing apparatus 800.

In FIG. 12, one or more operations may be performed by a controller and/or a processor of the second motion recognizing apparatus 800 of FIG. 8.

In operation 1210, when the second motion recognizing apparatus 800 includes a light measuring unit, the second motion recognizing apparatus 800 may measure a light intensity of light.

In operation 1212, the second motion recognizing apparatus 800 may output a light towards a subject to illuminate a portion where a motion occurs in the subject. For example, light may be outputted every time the subject is photographed or may be outputted when the light intensity measured in operation 1210 is less than a predetermined intensity.

In some embodiments, operation 1210 and/or operation 1212 may be optional or may not be included.

In operation 1214, the second motion recognizing apparatus 800 may photograph a subject using a plurality of cameras, and output, to corresponding spatio-temporal correlators, events through target sensing units corresponding to the portion where the motion occurs in the subject.

In operation 1216, the second motion recognizing apparatus 800 may generate histograms with respect to events outputted from image sensors included in the plurality of cameras.

In operation 1218, the second motion recognizing apparatus 800 may move, by a predetermined offset interval to an x-axis direction, one of the generated histograms, and may calculate a correlation between the histograms.

In operation 1220, when the correlation is highest, that is, when the correlation is closest to '1' or is the same as '1', the second motion recognizing apparatus 800 may determine a distance that the histogram is moved towards the x-axis direction, that is, offset, as a view difference.

In operation 1222, the second motion recognizing apparatus 800 may calculate a depth of the portion where the motion occurs, based on the calculated view difference.

In operation 1224, the second motion recognizing apparatus 800 may combine, based on the calculated view difference, events inputted in operation 1214, and may output a single image constituted by the events.

In operation 1226, a threshold that determines whether a spatio-temporal correlation is high or low may be determined. For example, the threshold may be set to a predetermined value or may vary based on the light intensity measured in operation 1210.

When the image constituted by the events obtained by the plurality of cameras is generated and the threshold is determined, the second motion recognizing apparatus 800 may proceed with operation 1118 of FIG. 11 to trace a motion locus and may perform motion control. Operations performed after the events are combined may be similar to the operations described with reference to FIG. 11.

The first motion recognizing apparatus 100 and the second motion recognizing apparatuses 800 may be utilized instead of conventional user interfaces (UI) and/or remote controllers utilized by devices, such as, for example, a television (TV), a computer, a mobile phone, a personal digital assistant (PDA), a game console, and the like, that use various application programs. For instance, the motion recognizing apparatuses may be used to control a graphical user interface or the like similar to a conventional mouse or touchpad, in some embodiments.

According to one or more of the motion recognizing apparatuses and methods, a sensing unit senses a change in an intensity of a light outputs events, unlike a conventional sensor that outputs an image at predetermined time intervals, may detect a moving object excluding a fixed image. In some implementations, the motion recognizing apparatus and method may include an image pre-processing procedure performed to recognize a moving object.

The motion recognizing apparatus and method may recognize a motion of an object within a relatively short amount of time, for example about 1 ms, and thus, may recognize the motion in real time.

The motion recognizing apparatus and method may obtain depth information associated with a depth of an object where a motion occurs, through a plurality of image sensors. The depth information may be used for recognizing a motion including a depth, such as, for instance, a pushing motion where a hand is extended ahead of a body or the like. The depth information may also be used for removing background noise. For example, when information associated with a depth between cameras and a person who moves are provided, a motion occurring in a distance far from the person who moves may be disregarded. Thus, even though motion may be occurring behind the person, the movement of the person may be accurately recognized.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motion recognizing apparatus comprising:
an optical sensor configured to sense at least a portion of a subject where a motion occurs and to output one or more events in response thereto;

a motion tracing unit configured to trace a motion locus of the portion where the motion occurs based on the one or more outputted events; and a motion pattern determining unit configured to determine a motion pattern of the portion where the motion occurs based on the traced motion locus.

2. The apparatus of claim 1, further comprising:
a light source unit configured to output light towards the subject to illuminate the portion where the motion occurs in the subject.

3. The apparatus of claim 2, wherein the light source unit outputs infrared, visible, and/or ultraviolet light.

4. The apparatus of claim 2, further comprising:
a light measuring unit configured to measure the intensity of the light,
wherein the light source unit outputs the light when the light intensity measured by the light measuring unit is less than a predetermined intensity.

5. The apparatus of claim 1, wherein the optical sensor comprises a plurality of optical sensors, and the apparatus further comprises:
a view difference calculator configured to calculate a view difference between the plurality of optical sensors, based on histograms of events outputted from the optical sensors; and
a combining unit configured to combine, based on the calculated view difference, the events outputted from the plurality of optical sensors.

6. The apparatus of claim 5, further comprising:
a depth calculator configured to calculate, based on the calculated view difference, a depth of the portion where the motion occurs.

7. The apparatus of claim 1, wherein the optical sensor comprises a plurality of sensing units, and target sensing units from among the plurality of sensing units output the events, the target sensing units corresponding to sensing units that sense the portion where the motion occurs.

8. The apparatus of claim 7, wherein the motion tracing unit comprises:
one or more spatio-temporal correlators configured to calculate a spatio-temporal correlation between the target sensing units based on the events inputted from the target sensing units; and
a motion locus tracing unit configured to trace the motion locus of the portion where the motion occurs.

9. The apparatus of claim 8, wherein of the one or more spatio-temporal correlators include an internal state value indicating a corresponding spatio-temporal correlation, increases the internal state value each time the events are inputted, and compares the increased internal state value with a predetermined threshold to determine whether the corresponding spatio-temporal correlation is high or low.

10. The apparatus of claim 9, further comprising:
a light measuring unit to measure the intensity of the light, wherein the one or more spatio-temporal correlator set the threshold based on the measured light intensity.

11. The apparatus of claim 9, wherein, the optical sensor comprises a plurality of optical sensors exists, and the apparatus further comprises a depth calculator configured to calculate, based on a view difference between the plurality of optical sensors, a depth of the portion where the motion occurs, and each of the plurality of spatio-temporal correlators sets the threshold based on the depth of the portion where the motion occurs.

12. The apparatus of claim 8, wherein the motion locus tracing unit is configured to generate a cluster by grouping spatio-temporal correlators having a high spatio-temporal correlation from among the plurality of spatio-temporal correlators, the cluster being in a shape corresponding to the portion where the motion occurs, and to trace the motion locus based on a center of the generated cluster and a center of a previously calculated cluster.

13. The apparatus of claim 8, wherein the plurality of spatio-temporal correlators are mapped to divided areas of the optical sensor, and the divided areas overlap with at least one adjacent area.

14. The apparatus of claim 1, further comprising:
a motion controller configured to output a control command based on the determined motion pattern.

15. The apparatus of claim 1, wherein an event includes information associated with a time when a corresponding event is generated, a location of a sensing unit that outputs a corresponding event, a polarity, or any combination thereof.

16. The apparatus of claim 1, wherein the outputted events are generated in response to a change in light intensity sensed by the optical sensor.

17. A motion recognizing method comprising:
sensing at least a portion of a subject where a motion occurs using an optical sensor, and outputting one or more events in response thereto;
tracing a motion locus of the portion where the motion occurs, based on the one or more outputted events; and
determining a motion pattern of the portion where the motion occurs based on the traced motion locus.

18. The method of claim 17, further comprising:
outputting light towards the subject to illuminate the portion where the motion occurs in the subject, before the sensing and the outputting the one or more events.

19. The method of claim 18, further comprising:
measuring the intensity of light, before the sensing and the outputting; and
outputting light when the light intensity measured by the light measuring unit is less than a predetermined intensity.

20. The method of claim 17, wherein the optical sensor comprises a plurality of optical sensors, and the method further comprises:
calculating a view difference between the plurality of optical sensors, based on histograms of events outputted from the plurality of optical sensors; and
combining, based on the calculated view difference, the one or more events outputted from the plurality of optical sensors.

21. The method of claim 20, further comprising:
calculating, based on the calculated view difference, a depth of the portion where the motion occurs.

22. The method of claim 20, wherein one or more of the optical sensors includes a plurality of sensing units, and target sensing units from among the plurality of sensing units output the events, the target sensing units corresponding to sensing units that sense the portion where the motion occurs.

23. The method of claim 22, further comprising:
calculating, by one or more spatio-temporal correlators, a spatio-temporal correlation between the target sensing units based on the events inputted from the target sensing units.

24. The method of claim 23, wherein:
the one or more spatio-temporal correlators include an internal state value indicate a corresponding spatio-temporal correlation; and
the calculating increases the internal state value each time the events are inputted, and compares the increased internal state value with a predetermined threshold to determine whether the corresponding spatio-temporal correlation is high or low.

25. The method of claim 24, further comprising:
measuring the intensity of light,
wherein the calculating sets the threshold based on the measured light intensity.

26. The method of claim 24, wherein the optical sensor comprises a plurality of optical sensors, and the method further comprises calculating, based on a view difference between the plurality of optical sensors, a depth of the portion where the motion occurs, and the calculating sets the threshold based on the depth of the portion where the motion occurs.

27. The method of claim 23, wherein the tracing comprises:
generating a cluster by grouping one or more spatio-temporal correlators having a high spatio-temporal correlation from among the one or more spatio-temporal correlators, the cluster being in a shape corresponding to the portion where the motion occurs;
calculating a center of the generated cluster; and
tracing the motion locus based on the center of the generated cluster and a center of a previously calculated cluster.

28. The method of claim 23, wherein the one or more spatio-temporal correlators are mapped to divided areas of the optical sensor, and the divided areas overlap with at least one adjacent area.

29. The method of claim 17, further comprising:
outputting a control command based on the determined motion pattern.

30. The method of claim 17, wherein an event includes information associated with a time when a corresponding event is generated, a location of a sensing unit that outputs a corresponding event, a polarity, or any combination thereof.

31. A motion recognizing apparatus for sensing motion inputted by a user, the apparatus comprising:
an optical sensor configured to sense at least a portion in a subject where a motion occurs, and to output one or more events in response thereto; and
at least one processor configured to:
trace a motion locus of the portion where the motion occurs, based on a spatio-temporal correlation of the one or more outputted events,
determine a motion pattern of the portion where the motion occurs, based on the traced motion locus, and
identify a corresponding input signal of the user based on the determined motion pattern.

32. The method of claim 31, wherein an event includes information associated with a time when a corresponding event is generated, a location of a sensing unit that outputs a corresponding event, a polarity, or any combination thereof.

* * * * *